United States Patent [19]

Kreger

[11] 4,123,916
[45] Nov. 7, 1978

[54] AUTOMOTIVE HEAT PUMP

[75] Inventor: Thomas C. Kreger, Clarkston, Mich.

[73] Assignee: Ford Motor Company, Dearborn, Mich.

[21] Appl. No.: 813,058

[22] Filed: Jul. 5, 1977

[51] Int. Cl.$^2$ ............................................. B60H 3/04
[52] U.S. Cl. .......................................... 62/243; 62/6; 62/7
[58] Field of Search .......................... 62/61, 6, 7, 243; 165/42, 63

[56] References Cited

U.S. PATENT DOCUMENTS

| 3,777,485 | 12/1973 | Emerson | 62/243 |
| 3,823,568 | 7/1974 | Bijasiewicz et al. | 62/243 |
| 3,857,245 | 12/1974 | Jones | 62/7 |

Primary Examiner—Lloyd L. King
Attorney, Agent, or Firm—Joseph W. Malleck; Olin B. Johnson

[57] ABSTRACT

An apparatus and system is disclosed for extracting heat units from a relatively lower temperature zone of a cooling system for a Stirling engine and conveying said heat units to a relatively higher temperature zone serving as the passenger compartment of a vehicle. The system is reversible for either heating or cooling of the passenger compartment. The system makes it possible to employ waste heat units of the Stirling engine cooling system even though the average temperature of such cooling system is 60° F or less.

8 Claims, 2 Drawing Figures

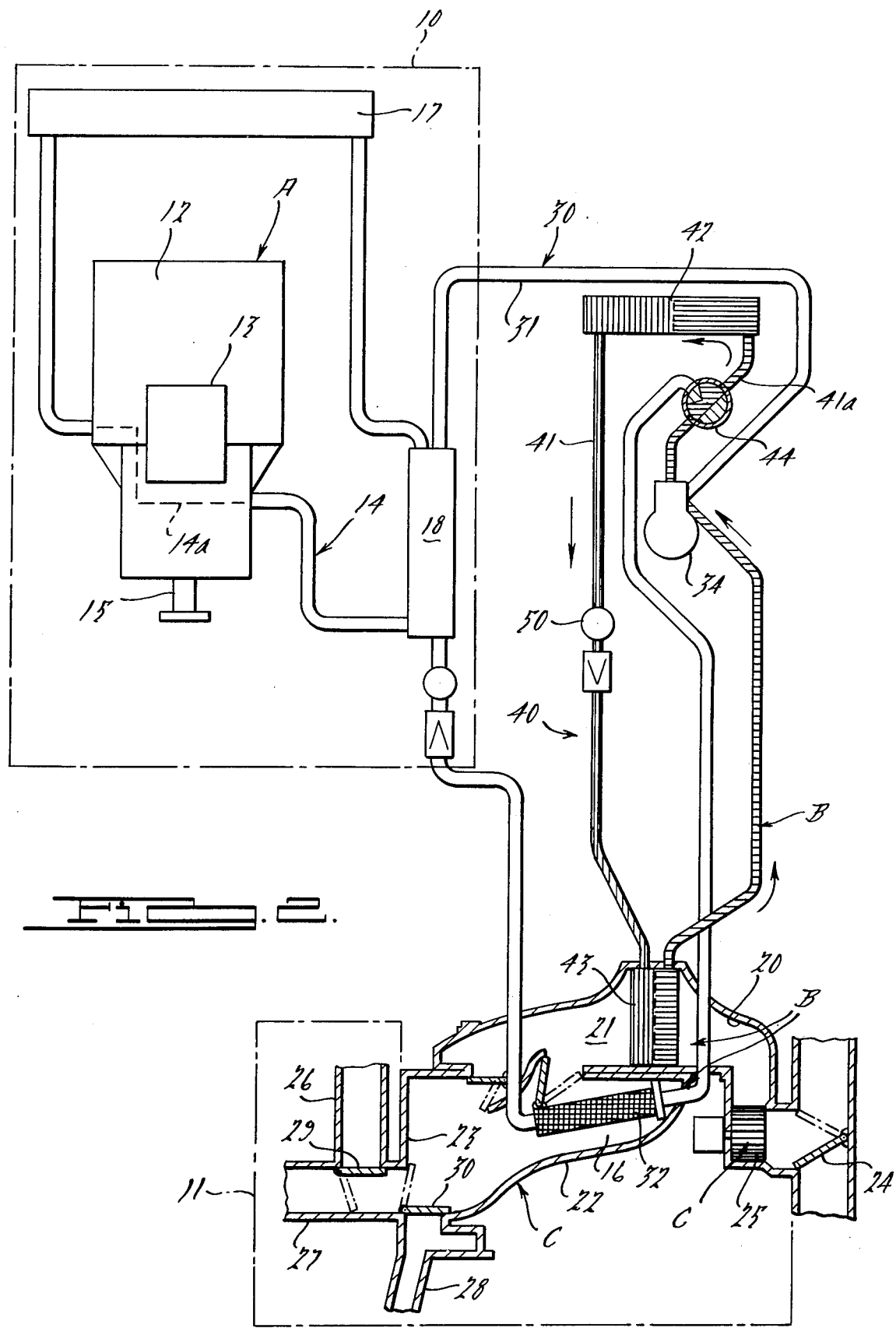

AUTOMOTIVE HEAT PUMP

BACKGROUND OF THE INVENTION

A Stirling engine is typically characterized by a continuously operating external heating circuit which transfers heat to an internal or closed working circuit, the latter typically employing hydrogen at extremely high pressures. The closed working fluid circuit is thermodynamically cycled requiring the input of heat from said external circuit and the extraction of heat by a cooling system. In order for the engine to operate for automotive purposes, the average cooling temperature must be maintained at about 60° F. This low temperature is in very abrupt contrast with the much higher temperature of the coolant tolerated in internal combustion engines, the latter being typically about 180° F.

The lower average coolant temperature for Stirling engines presents certain problems for the automotive designer in providing for passenger comfort. Waste heat units for such an engine must be utilized in a different manner than known by the prior art with internal combustion engines, if the passenger compartment is to be consistently heated during periods when heating is required. If a conventional heating system were to be utilized in connection with a Stirling type engine for purposes of heating the passenger compartment, there would be insufficient heat for passenger comfort, since the coolant would be conveyed directly to a heater core in the passenger compartment and would not have sufficient temperature to heat the air flowing therepast to provide for proper comfort.

One prior art attempt to overcome this problem has been to extract heat units from the exhaust gas of such Stirling engines and transfer such heat units to the air supply in the passenger compartment. However, at low road load conditions, there is insufficient heat units from the exhaust to again properly heat the air being supplied to the passenger compartment to a proper comfort level.

SUMMARY OF THE INVENTION

A primary object of this invention is to provide an air conditioning system for a vehicle powered by a Stirling engine, the system being effective to supply adequate heat for purposes of conditioning the air of a passenger compartment, the supply of heat being derived from the engine and is controlled to be more constant and adequate at all load conditions of the vehicle.

Another object of this invention is to provide an air conditioning system for vehicle powered by a Stirling engine which system is reversible in that it provides for either heating by way of waste heat units exhausted from the engine or cooling by extracting heat units from the passenger compartment.

Yet still another object of this invention is to provide an air conditioning system for a vehicle powered by a Stirling engine which provides not only for heating and cooling, but for increased dehumidification.

Yet another object of this invention is to provide an air conditioning system for a Stirling engine powered vehicle which system raises the operating efficiency of the engine during the heating mode of the system.

Features pursuant to the above objects comprise the use of, (a) an apparatus employing a thermally cycled and pressure cycled refrigerant which is effective to pump heat units from a relatively low temperature zone (such as a cooling system from the Stirling engine) to a relatively higher temperature zone (such as the passenger compartment), said heat pump function being carried out by evaporation and condensation of a pressure cycled refrigerant.

SUMMARY OF THE DRAWINGS

FIG. 2 is a schematic illustration similar to that in FIG. 1, but illustrating the cooling mode of the air conditioning system.

DETAILED DESCRIPTION

Figure 1:
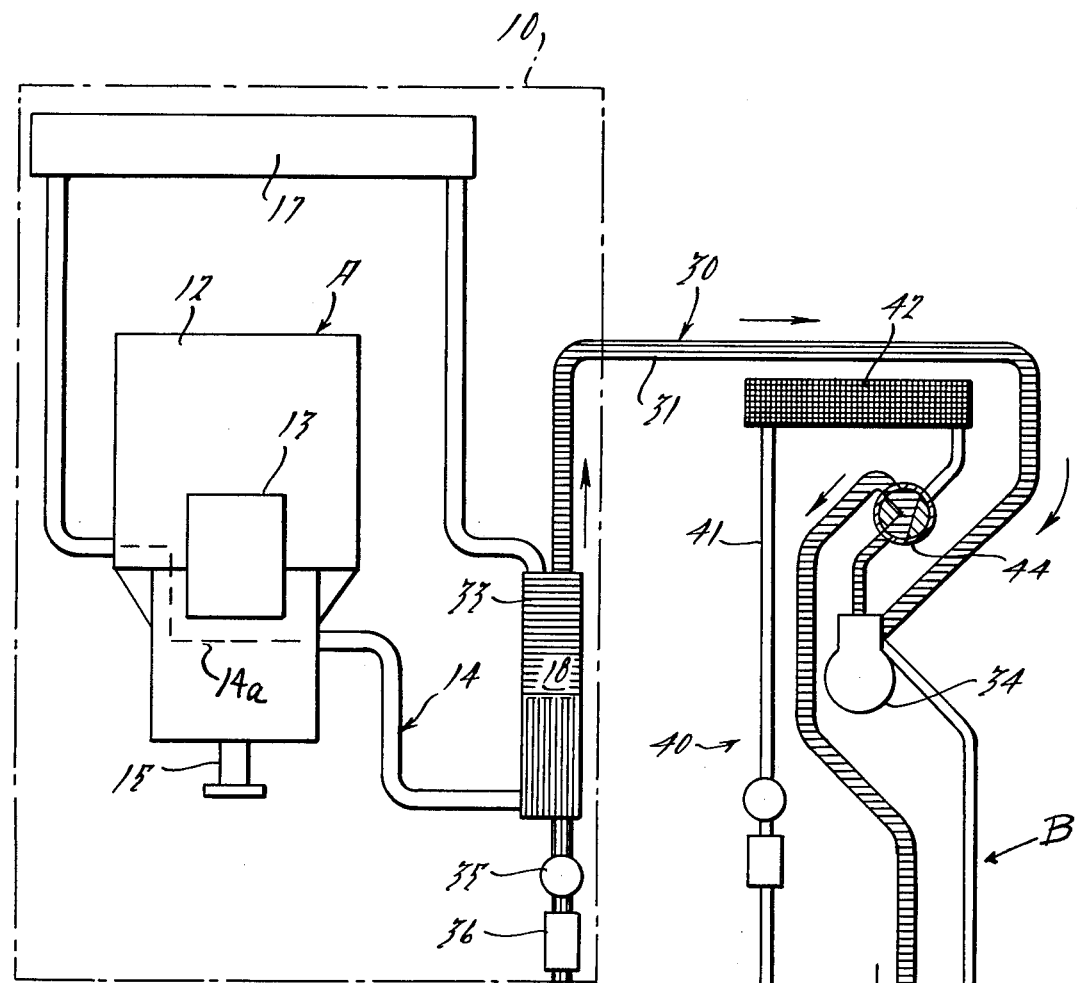
FIG. 1 is a schematic illustration of the various components of the invention including a Stirling engine and air conditioning system for a passenger compartment of a vehicle powered by said engine, FIG. 1 illustrating the heating mode of the air conditioning system.
Figure 1:
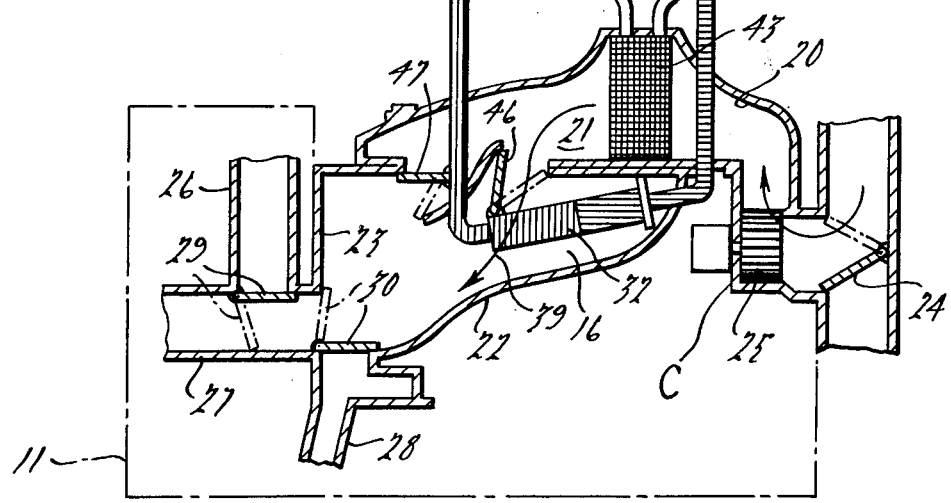

Turning now to the Figures, particularly FIG. 1, the vehicle has an engine compartment 10 and a passenger compartment 11; the engine compartment contains a Stirling engine A and an air conditioning apparatus B effective to modulate the temperature and humidity of the air passing through the air flow system C for the passenger compartment.

The Stirling engine A typically comprises an external circuit 12 effective to combust a source of fuel and provide an input of heat to a closed circuit 13. The working fluid within the closed circuit is cycled between high and low temperature conditions, this requiring a cooling circuit 14 effective to extract heat units in one zone 14a of the closed circuit. An output shaft 15 is mechanically coupled to an element driven by the thermal cycling of the closed circuit. The cooling circuit 14 is of importance to this invention since it provides a source of heat units which are deployed in a manner where the zone (14a) from which they are taken is at a lower temperature than the zone 16 to which they are being transferred. The cooling circuit 14 for the engine, at the heat absorbing zone 14a, comprises a series of heat absorbing tubes arranged within the closed circuit (not shown); the heated cooling fluid is conveyed to an external radiator cooling zone 17 typically located at the forward end of the vehicle which receives ram or circulated air for cooling fluid in the cooling circuit. At zone 18, intermediate the heat absorbing zone and the condensing zone 16, heat is extracted for purposes of being deployed for the air conditioning system.

The air flow system C comprises walls 20 defining a cooling and dehumidification chamber 21 through which air, inducted from the exterior of the vehicle, is conveyed to the passenger compartment. Walls 22 define a chamber 23 providing for heating of the air flow to the passenger compartment. The air flow through system C is taken from two different sources depending upon control of door 24 which is effective to control the amount of air drawn either from outside or from inside the passenger compartment. The air is positively moved through the passenger compartment by way of a blower 25. The air flow is selectively directed (by way of doors 29 and 30) to a variety of different stations within the passenger compartment 11 as is typical for air conditioning systems in vehicles today. For example, the air flow may be directed to certain elevated air conditioning registers by way of a duct 26, or to certain defroster outlet locations by way of an outlet conduit 27 or to floor registers by way of an outlet conduit 28.

A first refrigerant circuit 30 is arranged to transfer heat units from the cooling system 14 to the air flowing through chamber 23 to promote heating of the air flow therethrough. The first refrigerant circuit comprises a circuit line 31 which contains a evaporator 33 located in heat transfer relationship with heat exchange tubing of the cooling circuit 14 at zone 18. A compressor 34 is interposed in the circuit 30 to receive refrigerant flow from the evaporator 33 and send the pressurized flow to condenser 32. An expansion valve 35 and check valve 36 is disposed immediately upstream from evaporator 33 to insure directional flow.

A second refrigerant circuit 40 is employed to circulate refrigerant along a closed line 41 which includes, in series, an evaporator 43 exposed in chamber 21 to the air flow system, and further includes a condenser 42 disposed in a location where ambient ram or a circulated air flow may extract heat units therefrom. The compressor 34 is in common with both circuits 30 and 40. For purposes of circuit 40, the compressor is in one leg 41a of the circuit, the flow being adapted to move from a zone up stream of the compressor, through the compressor and thence in series to condenser 42 and evaporator 43. A directional changeover valve 44 is employed to selectively use the compressor with either circuit 30 or 40. In the position as shown in FIG. 1, it provides for the use of the second refrigerant circuit in conjunction with the compressor. In the opposite position, as shown in FIG. 2, the compressor is related solely to circuit 30.

In operation, and considering first the heating mode for the air conditioning apparatus as shown in FIG. 1, the changeover valve 44 is moved to a position as shown; the refrigerant in a zone immediately upstream from the compressor 34 is typically at a temperature of 35° F. and at a pressure of about 47 psia. The compressor elevates the refrigerant to a pressure of about 350 psia and to a temperature of about 180° F. The compressed refrigerant then engers condenser 32 where it is exposed to air flowing through the compartment as permitted by the air blend doors 46 and 47. Heat units are transferred to the air flowing therepast and although the temperature remains at about 180° F. and the pressure at about 350 psia, the refrigerant is converted to a condensed fluid, releasing heat to the air flow 39 as a result of condensation. The refrigerant then passes from the zone immediately downstream of the condenser to evaporator 33; expansion takes place by way of the expansion valve 35 and the pressure is reduced to 47 psia with a corresponding temperature reductionnto the level of 35° F. The refrigerant is exposed to the heat of the cooling system 14 at zone 18. The average temperature of the cooling medium in system 14 is about 40°-60° F. and the condensed refrigerant is evaporated as a result of heat absorption without sensible change in its temperature level or pressure.

Accordingly it can be appreciated that, for the heating mode, zone 18 of the cooling circuit 14, maintained at a temperature of 60° F. (when the ambient air is 40° F. or less), supplies heat units to an air flow zone desired to be maintained at a general temperature level of about 72° F. This heating mode takes heat units from a low temperature zone and pumps to a higher temperature zone. There may be some unusual conditions where the heating mode transfer may take place from a slightly higher temperature zone to a lower temperature zone, i.e., average cooling circuit 14 temperature at 80° F. when ambient air is 60° F. and the desired passenger compartment temperature is 72° F., but this will be infrequent and rare. Generally the average cooling circuit 14 temperature will be 60° F. or less when ambient air conditions are 40° F. or less.

In FIG. 2, for the cooling mode, the changeover valve 44 is shifted so that communication is provided between condenser 42 and compressor 34. Considering first the refrigerant in a zone immediately upstream from the compressor, it is typically in vapor form at a temperature of about 32° F. and a pressure of about 43.5 psia. Compression elevates the temperature to about 140° F. and a pressure of 220 psia. The pressurized evaporated refrigerant is passed through the condenser 42 and experiences a release of heat to ambient air conditions without an accompanying temperature or pressure loss. The refrigerant is condensed as a result of the release of heat and is passed through pressure reducer valve 50 so that it undergoes a temperature decrease to about 32° F. and a pressure decrease to about 43.5 psia. The condensed and pressure reduced refrigerant is then passed through the evaporator 43 where it absorbs heat from air flowing through compartment 21. The vaporized refrigerant is returned and subjected to recycling by compression.

I claim:

1. In a vehicle powered by an engine having a cooling system with its own independent radiator exposed to ambient air flow and regulated to a maximum cooling system fluid temperature less than 70° F. when ambient temperature conditions are 40° F. or lower, an air conditioning system for the passenger compartment of said vehicle which system is effective to both heat and cool said compartment selectively comprising:

(a) a first closed refrigerant circuit having an evaporator in heat absorbing relationship with said cooling system and having a condenser exposed to air flowing through said passenger compartment, said first closed refrigerant circuit being effective to utilize the heat carried by said engine cooling system as the source of heat for the heating mode of the air conditioning system, (b) a second closed refrigerant circuit having an evaporator exposed to air flowing through said vehicle compartment and a condenser exposed to ambient air, the second closed refrigerant circuit utilizing the heat within the passenger compartment as a source of heat for extraction and thereby cooling of said air, (c) a compressor driven by said engine common to each of said circuits for pressurizing the refrigerant for conveyance to either of said condensers, and (d) control means for selectively connection said compressor with either of said circuits whereby said first circuit may operate as the heating mode of said vehicle conditioning system in which the refrigerant absorbs heat from said engine cooling system while at a low pressure and then is elevated in pressure as well as temperature above 150° F. by said compressor so that heat can be released to the air flowing through said vehicle compartment which is at a temperature of at least 120° F. lower than said pressurized refrigerant resulting in condensation of the refrigerant.

2. The air conditioning system as in claim 1, in which said control means is effective to provide for pumping of heat between said engine cooling system maintained at an average coolant temperature of 50° F., to the air flowing through the passenger compartment which is selected to be at an average temperature of 72° F.

3. The air conditioning system as in claim 1, in which during the heating mode, the refrigerant is cycled between two temperature levels of approximately 35° F. and 180° F. and the pressure of said refrigerant is cycled between levels of about 47 psia and 350 psia.

4. The air conditioning system as in claim 2, in which the second refrigerant circuit for the cooling mode is cycled between two temperature levels of 32° F. and 140° F. and the pressure being cycled between levels of 43 psia and 220 psia.

5. A motor vehicle comprising a passenger compartment and means to convey an air flow therethrough for purposes of maintaining the air temperature of said compartment in the range of 70°–80° F., said vehicle being powered by a Stirling engine having a cooling system with its own independent radiator exposed to ambient air flow and regulated to a maximum cooling system fluid temperature of less than 80° F. when ambient air conditions are 60° F. or less and regulated to 80°–100° F. when ambient air conditions exceed 60° F. and means to reversibly carry heat units either from said cooling system to the air flowing through said passenger compartment or from said air flowing through the passenger compartment to ambient air.

6. A method of heating the passenger compartment of a vehicle powered by a Stirling engine, the Stirling engine having a cooling system with its own independent radiator exposed to ambient air and regulated to a cooling system temperature of less than 70° F. when heating is desired in the passenger compartment, the method comprising:
   (a) providing a closed refrigerant circuit wherein at least one portion of said refrigerant is condensed and has a pressure of about 47 psi and a temperature of 350° F.,
   (b) exposing said refrigerant in said one portion to the heat of said engine cooling system fluid whereby said refrigerant is vaporized substantially at the same temperature and pressure,
   (c) compressing said vaporizer refrigerant to a pressure of about 350 psia and to a temperature of about 180° F.,
   (d) exposing said compressed refrigerant to the air in said vehicle compartment which is to be heated to a temperature of about 72° F., and
   (e) condensing said compressed refrigerant then reducing its pressure to about 47 psia, and then recycling said condensed refrigerant according to steps (b) through (d).

7. An air conditioning system for a Stirling engine powered vehicle, which system has a heating mode and a cooling mode, and which system uses the heat carried by the engine cooling system as the source of heat for said heating mode, the air conditioning system comprising:
   (a) a first closed refrigerant circuit having an evaporator in heat absorbing relationship with said cooling system and having a condenser exposed to air flow through said passenger compartment,
   (b) a second closed refrigerant circuit having an evaporator exposed to air flow through said vehicle compartment and a condenser exposed to ambient air,
   (c) a compressor driven by said engine in common to each circuit for pressurizing the refrigerant for conveyance to either of said condensers, and
   (d) control means for selectively connecting said compressor with either of said circuits whereby said first closed circuit may operate at the heating mode for said vehicle conditioning system in which the refrigerant absorbs heat from said cooling system while at low pressure and is then elevated in pressure and to a temperature above 150° F. by said compressor so that heat can be released to the air flow through said vehicle compartment which is at a temperature of 60° F. or less, thereby resulting in condensation of the refrigerant.

8. The air conditioning system as in claim 7, in which the engine cooling system maximum temperature is at least 32° cooler than the desired average vehicle compartment air flow temperature, requiring said first closed refrigerant circuit to extract heat from a body at a temperature lower than the design temperature for the fluid body to which the heat is transferred.

* * * * *